United States Patent [19]

Naarmann et al.

[11] 4,205,144

[45] May 27, 1980

[54] PREPARATION OF GRAFT COPOLYMERS

[75] Inventors: Herbert Naarmann, Wattenheim; Graham E. McKee, Ludwigshafen; Burghard Schmitt, Worms, all of Fed. Rep. of Germany

[73] Assignee: BASF Aktiengesellschaft, Fed. Rep. of Germany

[21] Appl. No.: 952,801

[22] Filed: Oct. 19, 1978

[30] Foreign Application Priority Data

Nov. 5, 1977 [DE] Fed. Rep. of Germany ....... 2749579

[51] Int. Cl.$^2$ .............................................. C08L 51/04
[52] U.S. Cl. .................................... 525/273; 525/267; 525/290; 525/308; 525/309
[58] Field of Search ................ 260/877, 881, 885, 878

[56] References Cited

FOREIGN PATENT DOCUMENTS 1116403 11/1957 Fed. Rep. of Germany .
1055240 4/1959 Fed. Rep. of Germany .

Primary Examiner—Carman J. Seccuro
Attorney, Agent, or Firm—Keil & Witherspoon

[57] ABSTRACT

Graft copolymers comprising a crosslinked, saturated, elastomeric grafting base and a hard shell are prepared by incorporating thermolabile comonomers, as copolymerized units, into the grafting base during the preparation of the latter, in particular at a conversion of from 50 to 90%. During the subsequent grafting of the shell, the conditions used are such that the thermolabile comonomers incorporated as copolymerized units into the grafting base decompose into free radicals. This gives graft copolymers having improved mechanical properties, which copolymers also prove advantageous for the preparation of mixtures with other thermoplastics compatible with the graft copolymers.

1 Claim, No Drawings

PREPARATION OF GRAFT COPOLYMERS

The present invention relates to a process for the preparation of high-impact aging-resistant graft copolymers by graft polymerization of monomers which form a hard polymer, in the presence of a saturated crosslinked elastomeric polymer.

The preparation of high-impact molding compositions by graft copolymerization of monomers which form hard polymers, eg. styrene, acrylonitrile and/or methyl methacrylate, in the presence of a rubber is a well-known process. If the products obtained are not only to have high impact strength but also high resistance to weathering and to aging, saturated rubbers, eg. elastomeric acrylic ester polymers or ethylene-propylene rubbers, must be employed for the graft polymerization. To achieve good impact strength of the molding compositions, it has proved advantageous if the saturated rubbers used in the graft copolymerization are crosslinked. Molding compositions thus obtained are disclosed, for example, in German Pat. No. 1,260,135.

However, it is a disadvantage of these conventional molding compositions that the monomers which form hard polymers do not graft readily onto the saturated crosslinked elastomeric polymer, so that the molding compositions do not attain the optimum impact strength. Many attempts have therefore been made to increase the grafting yield, ie. the proportion of monomers grafted onto the elastomeric polymer, when polymerizing monomers which form hard polymers in the presence of saturated crosslinked elastomeric polymers.

As an example of such attempts, German Published Application DAS 2,258,541 recommends using derivatives of monoallylfumaric acid or monoallylmaleic acid as comonomers when preparing the elastomeric polymer used as the grafting base. However, it has been found that this approach only gives the same degree of success as does the use of conventional crosslinking agents in the preparation of the elastomeric polymer (cf. German Pat. Nos. 1,164,080 and 1,260,135).

It has also been proposed to introduce free radical groups, or groups which form free radicals, into the saturated crosslinked elastomeric polymers, in order to increase their grafting activity. This can be achieved, for example, by irradiating the saturated crosslinked elastomeric polymer in the presence of oxygen or by chemical reaction of the elastomeric polymer. The advantageous method of introducing free radical-forming groups into the saturated crosslinked elastomeric polymer is, however, by copolymerization of monomers containing free radical-forming groups when preparing the elastomeric copolymer.

German Published Applications DAS 1,055,240 and DAS 1,116,403 describe a process for the preparation of graft copolymers wherein, as a first stage, monomers forming elastomeric polymers are copolymerized with monomeric compounds containing free radical-forming groups, under conditions under which the said groups do not decompose. The monomers which form hard polymers are then graft polymerized in the presence of these saturated crosslinked elastomeric polymers containing free radical-forming groups, under conditions under which the said groups decompose. The free radicals thus formed in the elastomeric polymer are capable of initiating the polymerization of the monomers which form hard polymers and thus lead to a progressive increase in the grafting yield of the graft copolymerization. Similar processes are disclosed in German Laid-Open Application DOS 2,546,238 and in Makromolekulare Chemie, 177 (1976), 1,357–1,371. However, these processes also do not give products with an optimum pattern of properties.

It is an object of the present invention to improve the conventional high-impact, aging-resistant and weathering-resistant graft copolymers, based on saturated crosslinked elastomeric polymers, in respect of their mechanical properties, in particular in respect of their impact strength, surface gloss and heat resistance. This object is achieved by means of the process according to the invention.

Accordingly, the present invention relates to a process for the preparation of graft copolymers by polymerization of monomers which form hard polymers in the presence of a saturated crosslinked elastomeric polymer having a glass transition temperature below 0° C., in which first (A) the monomers which form the elastomeric polymer are copolymerized with copolymerizable monomeric compounds, containing free radical-forming groups, under conditions which preserve the said groups, to give a saturated crosslinked elastomeric polymer containing free radical-forming groups, and thereafter (B) the monomers which form hard polymers are polymerized in the presence of the elastomeric polymer obtained in process stage (A), under conditions under which the free radical-forming groups of the elastomeric polymer decompose. In the said process, the copolymerizable monomeric compounds containing free radical-forming groups are added, during the preparation of the saturated crosslinked elastomeric polymer, to the polymerization mixture in process stage (A) only when the conversion of the monomers forming the elastomeric polymer is from 50 to 90% by weight, after which polymerization of the mixture is taken to completion.

We have found, surprisingly, that as a result of the comonomers containing free radical-forming groups only being added, in process stage (A) of the preparation of the saturated crosslinked elastomeric polymer, when the conversion of the monomers forming the elastomeric polymer is well advanced, graft copolymers having improved mechanical properties can be obtained. In particular it proves possible, using the procedure according to the invention, to increase the impact strength, the surface gloss and the heat resistance of the graft copolymers. A further advantage of the process according to the invention, compared to the procedures disclosed, for example, in German Published Applications DAS 1,055,240 and DAS 1,116,403, is that smaller amounts of the copolymerizable monomeric compounds containing free radical-forming groups can be employed and that there is substantially more freedom in the choice of these monomeric compounds containing free radical-forming groups than in the procedure of the prior art, according to which the copolymerizable monomeric compounds containing free radical-forming groups must be added to the reaction mixture at the beginning of the polymerization, in process stage (A).

To carry out the process according to the invention, a saturated crosslinked elastomeric polymer containing free radical-forming groups is first prepared, in a first process stage (A). For the purposes of the present invention, saturated elastomeric polymers are in particular polymers of acrylic acid esters with alcohols of 1 to 8 carbon atoms. Examples of suitable acrylic acid esters for synthesizing the said elastomeric polymers are ethyl acrylate, n-butyl acrylate or ethylhexyl acrylate. For the purposes of the present invention, the acrylic acid esters may be used individually, or as mixtures with one another, in preparing the elastomeric polymer. Up to 30% by weight of other comonomers, for example styrene, acrylonitrile or vinyl alkyl ethers may be used together with the alkyl acrylates to prepare the elastomeric polymers of acrylic acid esters. Further suitable saturated elastomeric polymers are ethylene-propylene rubbers crosslinked by means of a non-conjugated diolefin (EPDM rubbers). The elastomeric polymers prepared in process stage (A) should have a glass transition temperature below 0° C. and preferably below −20° C. The glass transition temperature can be determined by the methods described in B. Vollmert, Grundri β der makromolekularen Chemie, pages 406–410, Springer-Verlag, Heidelberg (1962).

Process stage (A) is carried out, according to the invention, by first polymerizing the monomers which form the elastomeric polymer, for example the above acrylic acid esters, with or without other comonomers, in a conventional known manner. However, the polymerization conditions should be selected so that the free radical-forming groups of the copolymerizable monomeric compounds containing such groups, which are added in the course of the polymerization, only suffer a slight degree of decomposition. This may be achieved, for example, by polymerizing the monomers which form the elastomeric polymer under the conditions described in German Published Application DAS 1,055,240.

Advantageously, however, the polymerization of the monomers forming the elastomeric polymer in process stage (A) is carried out in aqueous emulsion. For this, conventional emulsifiers, eg. alkali metal salts of alkylsulfonic acids or alkylarylsulfonic acids, fatty alcohol sulfonates or alkali metal salts of fatty acids of 1 to 30 carbon atoms, are used, in general in amounts of from 0.3 to 5% by weight, especially from 1.0 to 2.0% by weight, based on the monomers. Other known conventional polymerization assistants, eg. buffers, molecular weight regulators and the like, can also be employed. The choice of the initiator and of the temperature used for this emulsion polymerization depend in the main on the choice of the copolymerizable monomeric compound, containing free radical-forming groups, which is used in process stage (A). The higher the decomposition temperature of the free radical-forming groups of these compounds, the higher can be the polymerization temperature. For low polymerization temperatures, ie. below about 40° C., and in particular for polymerization at from 0° to 30° C., redox catalysts are as a rule employed. The systems bisulfite/hydrogen peroxide/Fe(II) and t-butyl hydroperoxide-ascorbic acid/Fe(II) have proved particularly suitable for the polymerization of acrylic acid esters. If higher polymerization temperatures, eg. from 30° to 90° C., preferably from 50° to 75° C., can be employed, the conventional water-soluble initiators for emulsion polymerizations, eg. the persulfates, especially potassium persulfate, can be used.

According to the invention, the copolymerizable monomeric compounds containing free radical-forming groups are added, during process stage (A), when from 50 to 90% by weight, especially from 75 to 90% by weight, of the monomers forming the elastomeric polymer has been converted. The conversion can be determined in the conventional manner, for example by taking a sample of the polymerization mixture. We have found that the later the copolymerizable monomeric compounds containing free radical-forming groups are added to the polymerization mixture in process stage (A), the more advantageous are the results achieved. However, an essential precondition is that the copolymerizable monomeric compounds containing free radical-forming groups should be added sufficiently early for them to copolymerize with the monomers forming the elastomeric polymer and to become incorporated as copolymerized units into the elastomeric polymer. For this it is necessary that the addition of the copolymerizable monomeric compounds containing free radical-forming groups should be complete when the conversion of the monomers forming the elastomeric polymer is not more than 90% by weight. If the copolymerizable monomeric compounds containing free radical-forming groups are added to the polymerization mixture of process stage (A) at less than 50% by weight conversion of the monomers forming the elastomeric polymer, the success achievable according to the invention is not attained. In particular, there is frequently a very high degree of crosslinking of the polymer of process stage (A), characterized by a low degree of swelling in conventional solvents, and there is a reduced amount of grafting in process stage (B). Under these circumstances, test specimens exhibit surface streaks, weld marks and reduced toughness.

The copolymerizable monomeric compounds containing free radical-forming groups can be added to the polymerization mixture of process stage (A) in any desired manner, within the stated conversion range. For example, these monomeric compounds can be added to the polymerization mixture all at once or stepwise in several portions. Continuous addition is also feasible. The copolymerizable monomeric compounds containing free radical-forming groups are usually employed in an amount of from $10^{-2}$ to 2.5% by weight, preferably from $10^{-2}$ to $10^{-1}$% by weight, based on the monomers forming the elastomeric polymer. After completion of the addition of the copolymerizable monomeric compounds containing free radical-forming groups to the polymerization mixture of process stage (A), the mixture is finally polymerized to a conversion of more than 90% by weight, preferably more than 96% by weight, of the monomers which form the elastomeric polymer.

For the purposes of the invention, suitable copolymerizable monomeric compounds containing free radical-forming groups are, in principle, all conventional compounds of this type, as are described, for example, for the said purpose in the literature. In this context, reference may in particular be made to German Published Applications DAS 1,055,240 and DAS 1,116,403 and to German Laid-Open Application DOS 2,546,238, and to Makromolekulare Chemie 177 (1976), 1,357–1,371. It is particularly advantageous to use monomeric compounds containing free radical-forming groups, for which compounds the half-life of decomposition into free radicals at from 60° to 120° C. is from 0.25 to 2 hours. Examples of copolymerizable monomeric compounds containing free radical-forming groups, which can be employed according to the present invention, are:

1. unsaturated peroxides of the formula (I)

$$R^1\text{---}O\text{---}O\text{---}R^2 \qquad (I)$$

2. monomeric azo compounds of the formulae (IIa) and (IIb)

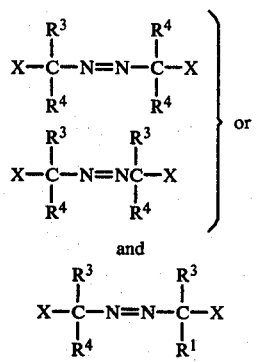
(IIa)

or and (IIb)

3. unsaturated C-C-labile compounds which can decompose into free radicals and which have the formula (III)

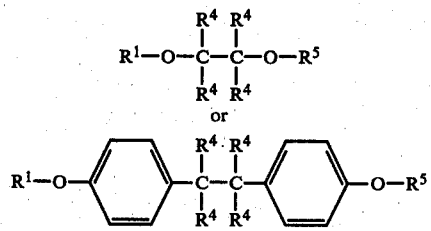
(III)

or (IV)

In the formulae I to IV:

$R^1$ is $CH_2=CH-CO$, $CH_2=C(CH_3)-CO-$, $HOOC-CH=CH-CO-$ or $CH_2=CH-CO-O-CH_2-C(CH_3)_2-$, $R^2$ is alkyl, cycloalkyl, aryl, alkaryl or aralkyl of 1 to 20 carbon atoms, or has one of the meanings given for $R^1$, $R^3$ is $CH_2=CH-COO-(CH_2)_n-$, $CH_2=C(CH_3)-COO-(CH_2)_n-$, $CH_2=CH-CONH-(CH_2)_n-$, $CH_2=CH-CONH-C(CH_3)(CH_2-)-CH_2-$, $CH_2=C(CH_3)-CH_2-$, where n is 1, 2, 3 or 4, $R^4$ is alkyl, cycloalkyl, aryl, alkaryl or aralkyl of 1 to 20 carbon atoms, $R^5$ is hydrogen or has one of the meanings given for $R^2$ and X is Cl, Br, $SO_3H$ or, in particular, CN.

For the process according to the invention, compounds (1) to (8) listed in Table 1 below are particularly preferred. The compounds are characterized, in the Table, by their half-life, $T_{\frac{1}{2}}$, at a particular temperature.

TABLE 1

| | Compound | Temp. | $T_{\frac{1}{2}}$ |
|---|---|---|---|
| (1) | $CH_2=CH-COO-CH_2-C(CH_3)(CN)-N=N-C(CH_3)(CN)-CH_2-OOC-CH=CH_2$ | 60° C. | 28' |
| (2) | $CH_2=C(CH_3)-COO-CH_2-C(CH_3)(CN)-N=N-C(CH_3)(CN)-CH_2-O-OC-C(CH_3)=CH_2$ | 60° C. | 35' |
| (3) | $CH_2=CH-CONH(CH_2)_3-C(CH_3)(CN)-N=N-C(CH_3)(CN)-(CH_2)_3-NH-CO-CH=CH_2$ | 80° C. | 16' |
| (4) | $CH_2=CHCOO-C_6H_4-C(CH_3)_2-C(CH_3)_2-C_6H_4-O-CO-CH=CH_2$ | 100° C. | 40' |
| (5) | $CH_2=C(CH_3)-COO-C_6H_4-C(CH_3)(C_2H_5)-C(CH_3)(C_2H_5)-C_6H_4-O-CO-C(CH_3)=CH_2$ | 100° C. | 52' |
| (6) | $CH_2=CH-COO-CH_2-C(CH_3)_2-O-O-C(CH_3)_2-CH_2-O-OCCH=CH_2$ | 60° C. | 42' |
| (7) | $CH_2=CH-CONH-C(CH_3)_2-CH_2-C(CH_3)(CN)-N=N-CH_2C(CN)(CH_3)-C(CH_3)_2-NH-CO-CH=CH_2$ | 80° C. | 23' |

TABLE 1-continued

| | | Temp. | $T_{\frac{1}{2}}$ |
|---|---|---|---|
| (8) | $CH_2=\overset{CH_3}{\underset{}{C}}-CH_2-\overset{CH_3}{\underset{CN}{C}}-N=N-\overset{CH_3}{\underset{CN}{C}}-CH_2-\overset{CH_2}{\underset{}{C}}=CH_2$ | 80° C. | 37' |

The saturated elastomeric polymers containing free radical-forming groups, prepared in process stage (A), must be crosslinked to give good impact strength of the graft copolymers. The crosslinking of the elastomeric polymers can be effected in various ways. For example, the polymerization of the monomers forming the elastomeric polymer can be carried out in the presence of a small amount of a crosslinking agent. For example, to prepare EPDM rubbers, ethylene and propylene are polymerized in the presence of a small amount of a non-conjugated diolefin. To prepare crosslinked elastomeric acrylic ester polymers, the esters, with or without other comonomers, can be copolymerized with known conventional crosslinking agents, eg. divinylbenzene, diallyl fumarate, diallyl maleate, butanediol diacrylate or, especially, tricyclodecenyl acrylate. The crosslinking agents are added to the polymerization mixture at the start of the polymerization and are in general employed in an amount of from 0.1 to 5% by weight, especially from 0.5 to 2% by weight, based on the monomers forming the elastomeric polymer.

However, in the process according to the invention it is possible, in process stage (A), when preparing the elastomeric polymer, to dispense with the addition of separate crosslinking agents, and to effect the crosslinking of the elastomeric polymer by means of the copolymerizable monomeric compounds containing free radical-forming groups. For example, this can be done by employing, in the process according to the invention, copolymerizable monomeric compounds, containing free radical-forming groups, which contain 2 or more non-conjugated olefinic double bonds. On the other hand, a certain degree of crosslinking of the elastomeric polymer can also be achieved by deliberately decomposing a small proportion of the free radical-forming groups during the copolymerization of the monomers forming the elastomeric polymer and of the copolymerizable monomeric compounds containing free radical-forming groups; this also results in crosslinking. Preferably, however, the crosslinking of the elastomeric polymers is effected by adding crosslinking agents at the start of the polymerization in process stage (A).

Process stage (A) thus gives saturated, non-crosslinked elastomeric polymers, containing free radical-forming groups, which serve as the grafting base for the graft polymerization of the monomers, forming hard polymers, carried out in the next process stage (B). Amongst the group of monomers which form hard polymers and are known and conventionally used for the manufacture of graft polymers—all of which monomers can in principle be employed for the purposes of the invention—styrene, acrylonitrile, methyl methacrylate and mixtures of these deserve particular mention. For example, mixtures of styrene and acrylonitrile, which contain these monomers in a weight ratio of from 90:10 to 60:40, preferably from 75:25 to 65:35, can be used for the graft polymerization in process stage (B). Mixtures of styrene and methyl methacrylate which contain from 5 to 50% by weight of styrene and from 95 to 50% by weight of methyl methacrylate can similarly be used for the graft polymerization. Ternary mixtures of styrene, acrylonitrile and methyl methacrylate containing these monomers in the weight ratio of 2.5/20/52.5 are also suitable. The process according to the invention has also proved particularly advantageous for cases where methyl methacrylate is employed as the sole grafting monomer.

In general, when carrying out the graft polymerization in process stage (B), from 20 to 90 parts by weight of the monomers forming hard polymers are polymerized in the presence of from 80 to 10 parts by weight of the elastomeric polymer from process stage (A). If the graft polymer is to be directly converted to moldings, from 65 to 85 parts by weight of the monomers forming hard polymers and from 35 to 15 parts by weight of the elastomeric polymer are employed for the graft polymerization. If, on the other hand, it is intended to compound the graft polymer with another hard polymer for the purpose of preparing the molding compositions, preferably from 30 to 50 parts by weight of the monomers forming hard polymers and from 70 to 50 parts by weight of the elastomeric polymer are used for the graft polymerization.

The graft polymerization itself can be carried out in any desired conventional manner. It is merely necessary to ensure that the conditions are such that the free radical-forming groups of the elastomeric polymer which serves as the grafting base are decomposed under the reaction conditions. This is in general the case if the graft polymerization is carried out at from 30° to 150° C., the value depending on the copolymerizable monomeric compounds, containing free radical-forming groups, which are employed in process stage (A). Preferably, the graft polymerization is carried out at from 80° to 120° C.

The graft polymerization in process stage (B), can, like the preparation of the elastomeric polymer in process stage (A), be carried out in aqueous emulsion. For this purpose, the same polymerization assistants as those described above, for example emulsifiers, buffers, regulators and the like, can be used in the known conventional manner. It is not absolutely essential, but is advantageous, to add a small amount of an additional, free catalyst to the polymerization mixture. Either water-soluble persulfates or preferably monomer-soluble organic peroxide compounds can be used, their proportion being from 0.05 to 0.2% by weight of the grafting monomers. If the reaction is carried out at atmospheric pressure, the polymerization temperature is from 30° to 80° C.; at polymerization temperatures of from 90° to 130° C., the grafting monomers are preferably polymerized under nitrogen at superatmospheric pressure. As an alternative to the procedure described above, the elastomeric polymer from process stage (A) can—where necessary, after isolation from its aqueous dispersion—be introduced into the grafting monomers, after which these are polymerized, with or without addition of a conventional polymerization initiator, eg. benzoyl peroxide or lauroyl peroxide, the polymerization being carried out either with the undiluted mixture or after addition of an inert solvent.

The graft copolymer isolated from the reaction solution in the conventional known manner is distinguished by its resistance to aging and to weathering and in particular by its good mechanical properties. Compared to products manufactured by conventional methods, the process according to the invention gives graft copolymers with improved impact strength, heat distortion resistance and surface gloss. The advantages achieved according to the invention manifest themselves particularly clearly and drastically if the monomers, forming hard polymers, employed in process stage (B) are those which are known not to graft easily onto saturated rubbers. Such monomers in particular include methyl methacrylate. When using methyl methacrylate as the grafting monomer, and an elastomeric acrylic ester polymer as the grafting base, it is possible, according to the invention, to produce transparent, aging-resistant and weathering-resistant molding compositions which have high impact strength and a very well-balanced combination of properties.

Depending on their rubber content, the graft copolymers prepared according to the invention may subsequently be compounded with hard, glassy polymers. These polymers should be compatible, or substantially compatible, with the hard polymers obtained from the monomers employed in process stage (B). In such blends, the content of the elastomeric polymer is in general from 5 to 30% by weight.

The graft polymers prepared according to the invention can contain the conventional additives for such products, eg. fillers, stabilizers, antistatic agents, plasticizers, flameproofing agents, lubricants, dyes and/or pigments, preferably in amounts of up to about 30% by weight of the graft polymer. The molding compositions can be processed by extrusion, deep-drawing or injection molding, to give a variety of moldings.

Examples 1 and 2 below illustrate the invention. The parts and percentages in the Examples are by weight.

Examples 1 and 2 include a number of comparative experiments representative of the prior art as described in the introductory section of the present text. In Example 1 only Experiments No. 5, 6, 9 and 10 represent the teaching according to the invention; the other experiments represent the prior art. In Example 2, a monomer mixture of 65 parts of styrene and 35 parts of acrylonitrile was used in stage (B) instead of methyl methacrylate. In other respects, Experiments 11 to 16 were carried out like Experiments 1 to 6 in Example 1, the Example with a particular second digit corresponding to the Example with the same digit as its sole number.

Only experiments 15 and 16 in Example 2 represent the teaching according to the invention.

The experimental results of Experiments No. 1 to 10 referred to in Example 1 are shown in Table 2, whilst the results of Example 2 (Experiments No. 11 to 16) are to be found in Table 3. In both Tables the gel content is listed as a measure of the content of insoluble material after process stage (B). The gel content is determined using a mixture of 2.6 parts by weight of the polymers in THF, which mixture is shaken for 10 hours and is then separated into soluble and insoluble constituents by means of a preparative ultracentrifuge. The insoluble material, dried to constant weight, and expressed as a proportion of the amount of polymer employed, gives the gel content. In a further column, the impact strength, measured in kJ/m², as determined on test specimens in accordance with DIN 53,453, is listed. The values given in brackets in this column relate to the percentage fracture of 10 tested standard small bars. The breaking energy, in nm, determined according to DIN 53,443 on 2 mm discs is listed in a further column, as a measure of the impact strength of the samples obtained. Finally, the reflectance, as a measure of the surface gloss, and the Vicat temperature, measured according to DIN 53,460, as a measure of the heat distortion resistance, are listed.

Tables 2 and 3 each show that the experiments carried out according to the process of the invention give products of greater surface gloss, heat distortion resistance and impact strength than those measured on samples prepared by prior art processes.

EXAMPLE 1

Experiment 1

150 parts of H₂O, 1.2 parts of the sodium salt of a paraffinsulfonic acid of 12 to 18 carbon atoms, 0.3 part of potassium persulfate (KPS), 0.3 part of sodium bicarbonate and 0.15 part of sodium pyrophosphate were introduced, under nitrogen, into a kettle equipped with a blade stirrer.

The solution was brought to 60° C. and a mixture of 0.33 part of dicyclopentadienyl acrylate (DCPA) and 16.33 parts of ethylhexyl acrylate (EHA) was then introduced. After 15 minutes prepolymerization, a further 1.77 parts of DCPA and 81.67 parts of EHA were metered in the course of 4 hours. After polymerizing for a further hour, a polymer dispersion having a solids content of about 40% was obtained.

237 parts of H₂O and 0.36 parts of KPS were added to 100 parts of this dispersion at 85° C. under nitrogen, and 120 parts of methyl methacrylate (MMA) were added in the course of 3 hours. After polymerizing for a further hour, the polymerization had ended and the solids content was about 35%.

200 parts of an 0.6% strength MgSO₄ solution were mixed into 100 parts of this dispersion at 95° C., the temperature was brought to 100° C. for about 15 minutes, the mixture was then cooled and filtered, and the polymer was centrifugally drained and dried under reduced pressure at 60° C.

Experiment 2

Experiment 1 was repeated, increasing the temperature during the methyl methacrylate polymerization to 120° C. and shortening the time of addition of the methyl methacrylate to 1 hour.

Experiment 3

Experiment 1 was repeated, adding 0.477 part of compound 3 (cf. Table 1) to the ethylhexyl acrylate feed, and omitting the addition of KPS when polymerizing the methyl methacrylate.

Experiment 4

Experiment 2 was repeated, adding 0.579 part of compound 5 (cf. Table 1) to the ethylhexyl acrylate feed, and omitting the addition of KPS when polymerizing the methyl methacrylate.

Experiment 5

Experiment 3 was repeated, adding 0.477 part of compound 3 (cf. Table 1) to the ethylhexyl acrylate feed after the latter had run in for 153 minutes. At this point, a conversion of 70% in polymerization stage (A) was found from a solids content determination.

Experiment 6

Experiment 4 was repeated, adding 0.579 part of compound 5 (cf. Table 1) to the ethylhexyl acrylate feed after the latter had run in for 153 minutes. A solids content determination indicated a conversion of 70%.

Experiment 7

Experiment 3 was repeated, adding 0.159 part of compound 3 (cf. Table 1) to the ethylhexyl acrylate feed, and omitting the addition of KPS when polymerizing the methyl methacrylate.

Experiment 8

Experiment 4 was repeated, adding 0.193 part of compound 5 (cf. Table 1) to the ethylhexyl acrylate feed, and omitting the addition of KPS when polymerizing the methyl methacrylate.

Experiment 9

Experiment 5 was repeated, adding 0.159 part of compound 3 (cf. Table 1) to the ethylhexyl acrylate feed after the latter had run in for 153 minutes. A solids content determination indicated a conversion of 70% after the stated feed time.

Experiment 10

Experiment 6 was repeated, adding 0.193 part of compound 5 (cf. Table 1) to the ethylhexyl acrylate feed after the latter had run in for 154 minutes. A solids content determination indicated a conversion of 70% after the stated feed time.

EXAMPLE 2

Experiments 11 to 16

Experiments 11 to 16 were carried out as described respectively in Experiments 1 to 6 of Example 1. However, instead of methyl methacrylate a mixture of 65 parts of styrene and 35 parts of acrylonitrile was used. In Experiments 15 and 16, compound 3 and 5 respectively (cf. Table 1) were added, in the amounts stated in Experiments 5 and 6 respectively, to the ethylhexyl acrylate after 153 minutes feed time. At this point in time, a conversion of 70% in process stage (A) was found from a solids content determination.

TABLE 2

| Example 1 | Gel content | Impact strength | Energy of fracture | Gloss % reflectance | Vicat temp. °C |
|---|---|---|---|---|---|
| Experiment 1 | 28.3 | 53.9 (100) | 2.15 | 31 | 80 |
| 2 | 29.1 | 63.2 (100) | 2.98 | 34 | 82 |
| 3 | 34.2 | 62.0 (100) | 5.04 | 32 | 79 |
| 4 | 30.2 | 78.2 (100) | 4.78 | 20 | 78 |
| 5 | 47.8 | 81.9 (60) | 11.90 | 81 | 89.5 |
| 6 | 44.5 | 103 (70) | 13.85 | 76 | 88 |
| 7 | 30.7 | 43.9 (100) | 4.03 | 30 | 80 |
| 8 | 31.7 | 67.1 (100) | 3.66 | 40 | 79 |
| 9 | 39.9 | 73.2 (50) | 12.42 | 80 | 90.5 |
| 10 | 43.9 | 88.6 (60) | 12.18 | 82 | 90 |

TABLE 3

| Example 2 | Gel content | Impact strength | Energy of fracture | Gloss % reflectance | Vicat temperature °C |
|---|---|---|---|---|---|
| Experiment 11 | 36.4 | 79.0 (70) | 5.88 | 14 | 85 |
| 12 | 31.2 | 70.3 (90) | 7.42 | 18 | 88 |
| 13 | 43.8 | 79.3 (50) | 10.7 | 38 | 86 |
| 14 | 40.6 | 71.9 (60) | 4.64 | 26 | 83 |
| 15 | 50.7 | — (0) | 33.4 | 75 | 93.5 |
| 16 | 56.4 | 95.6 (10) | 34.7 | 81 | 95.5 |

We claim:
1. A process for the preparation of graft copolymers by polymerization of monomers which form hard polymers in the presence of a saturated crosslinked elastomeric polymer having a glass transition temperature below 0° C. and selected from the group consisting of acrylate polymers consisting of acrylic acid esters and mixtures thereof, with up to 30% by weight of other unsaturated comonomers and EPDM rubbers, which EPDM rubbers are prepared by polymerizing ethylene and propylene in the presence of a small amount of a non-conjugated diolefin, in which first (A) the monomers which form the saturated crosslinked elastomeric polymer are copolymerized with copolymerizable monomeric compounds, containing free radical-forming groups, under conditions which preserve the said groups, to give a saturated crosslinked elastomeric polymer containing free radical-forming groups, and thereafter (B) the monomers which form hard polymers are selected from the group consisting of styrene, acrylonitrile and/or methylmethacrylate and are polymerized in the presence of the elastomeric polymer obtained in process stage (A), under conditions under which the free radical-forming groups of the elastomeric polymer decompose, in which process the copolymerizable monomeric compounds containing free radical-forming groups are added, during the preparation of the saturated crosslinked elastomeric polymer, to the polymerization mixture in process stage (A) only when the conversion of the monomers forming the elastomeric polymer is from 50 to 90% by weight, after which polymerization of the mixture is taken to completion.

* * * * *